Figure 1:
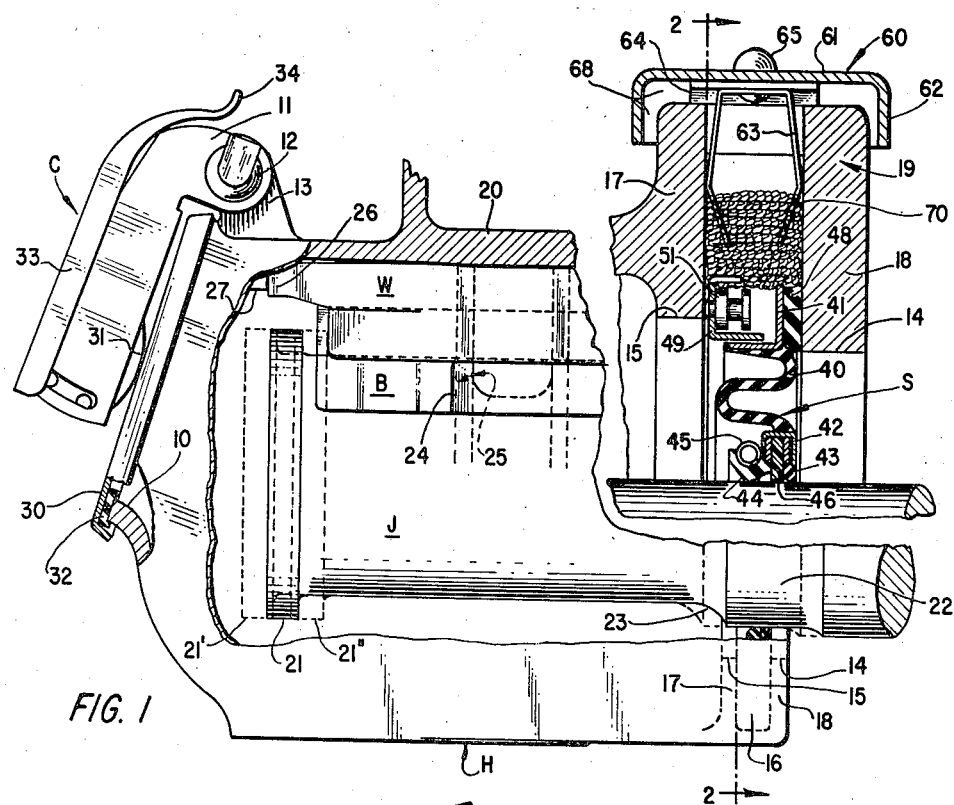

June 3, 1958  L. A. JOHNSON ET AL  2,837,355
PRESSURE EQUALIZING COVER FOR JOURNAL BOXES
Filed Feb. 17, 1955

United States Patent Office 2,837,355
Patented June 3, 1958

2,837,355
PRESSURE EQUALIZING COVER FOR JOURNAL BOXES

Lloyd A. Johnson, Woodside, Dan A. Christensen, Palo Alto, and Antone D. Martin, Menlo Park, Calif., assignors, by mesne assignments, to Federal-Mogul-Bower Bearings, Inc., Detroit, Mich., a corporation of Michigan Application February 17, 1955, Serial No. 488,908

3 Claims. (Cl. 286—6)

This invention relates to improvements in railway truck journal assemblies and more particularly to unique provisions for maintaining atmospheric pressure conditions in a conventional journal housing when both the front access opening and the journal opening at the rear are provided with fluid-tight seals.

For many decades, the common practice in railway truck journal design has been use of a standardized journal housing having a narrow dust guard well formed in its rear end wall. The journal proper was enclosed by the housing and its axle end projected through large area openings in the side walls of this well. Dust guard plates housed within this well embraced a sealing collar on the journal and cooperated with it and the well walls to retard the escape of oil and the entry of foreign matter. Such dust guards were notoriously unsatisfactory but have been tolerated for lack of a more suitable substitute.

Recently, applicants' assignee has provided a fluid-tight sealing device to replace the ineffective dust guard constructions heretofore known and has also developed a fluid-tight closure for the front access opening of the journal housing. While these developments have provided long-sought solutions for vexatious problems, they gave rise to a new problem, namely, the venting of considerable volumes of air quickly with respect to the interior of the housing while excluding water and foreign material. The need for this venting springs from the fact that the journal, in moving axially in and out of the housing as it constantly does in normal operation, displaces up to 40 cubic inches of air. Formerly, the loose fitting access covers and dust guards permitted the necessary air flow, but the new tightly sealed assemblies do not.

A primary object of this invention is the provision of breather means for journal assemblies by which atmospheric pressure conditions can be maintained within a journal housing which is otherwise sealed.

More particularly, an important object of the invention is the provision of simple means for utilizing portions of existing journal assemblies in cooperation with certain new elements to form means for equalizing the pressure conditions inside and outside the housing arising from temperature changes, axial movement of the journal and other causes.

Still another object is the provision of a novel cover for the dust guard well designed to permit large volume flow of air into or out of the housing while excluding water and foreign matter.

A further object is the provision of a snap-on cover for the dust guard which cooperates with the upper portion of the well to provide a breather for the journal housing.

Another object is the provision of means in the dust guard well of journal housings to filter air entering the housing, as well as means for confining air flow into and out of such housings to a path through the filter.

Figure 2:
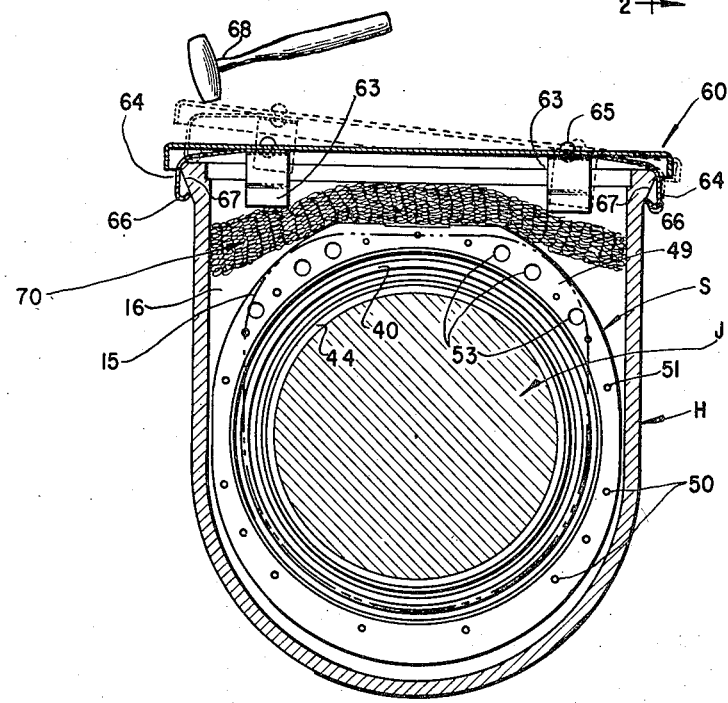

Numerous other objects and advantages of the invention will become apparent from the following detailed specification of an illustrative embodiment of the invention taken in connection with the accompanying drawings, wherein:

Figure 1 is a side view, partly in section, of a conventional railway truck journal assembly with its upper corner of the oil seal well shown in section on a larger scale; and Figure 2 is a cross-sectional view through the journal housing along line 2—2 on Figure 1 and on the scale of the left-hand and lower portion of Figure 1.

The drawings illustrate a conventional railway truck journal assembly which includes as major components, an outer housing H, a truck journal J, a front access cover C, and an oil sealing device S.

Housing H is of U-shape in cross-section as made clear by Figure 2. Its front end is provided with a large area access opening 10 which is normally closed by the manually-releasable fluid-tight cover device C. The latter includes a hinge 11 having a pivot pin 12 pivotly connecting the hinge to supporting lugs 13 projecting upwardly from the top edge of the housing.

The journal J projects from the outer face of the truck wheels (not shown) and into the housing through large area openings 14 and 15 in its rear end wall. This rear wall is thick enough to provide a deep narrow sealing ring well 16. In other words, the well is formed by the inner and outer side walls 17 and 18 respectively of well 16. The upper end of well 16 has an upstanding rim 19 projecting appreciably above the top wall 20 of housing H. A preferred type of fluid-tight oil sealing ring generally indicated at S is housed between the inner and outer walls of well 16. This seal will be described in further detail following a description of the manner in which the housing is supported on the journal.

Journal J terminates at its forward end in a radial thrust collar 21, while its rear end merges through a fillet 23 with a large diameter oil seal seating collar 22. A suitable plate-like bearing brass B is locked in place on the upper side of the journal by means of a locking wedge W interposed between the brass B and top walls 20 of the housing. Brass B is slightly shorter than the journal proper, i. e., the distance between collars 21 and 22, and is slidable along the top of the journal. Projecting from its opposite forward sides are a pair of heavy lugs 24 which engage the forward sides 25 of bosses projecting inwardly from the upper mid-portions of the housing side walls in accordance with long-standing practice. The rear end of brass B includes an upturned flange (not shown) which engages the rear end of wedge W and constitutes an interlocking connection between the two limiting movement in one direction longitudinally of housing H. The forward end 26 of the wedge is also positioned to abut keeper boss 27 projecting downwardly from the top wall 20 of housing H.

It will be evident from the foregoing that the various parts of the housing, journal, brass and wedge assembly are so contoured and constructed as to interfit and interlock with one another to hold the parts assembled so long as the housing is supported on the journal. Moreover, while so supported, the loosely fitting interlocking parts permit a considerable amount of relative movement between the parts. This movement is particularly pronounced lengthwise of the housing—especially when the ends of bearing brass B become worn in service by contact with thrust collar 21 and fillet 23. Normally, a new brass can move about one-quarter of an inch lengthwise of the journal. However, after the ends have become worn an aggregate of three-eighths of an inch, the permissible movement is excessive and the brass must be replaced.

Accordingly, it will be clear that under worn brass conditions, the journal may move axially a distance represented by the dotted positions of thrust flange 21' and 21", or sufficiently to displace some 40 cubic inches of air within the housing. Heretofore, the displacement of this much air has created no problem because the air could enter and leave the housing quite readily through the front access opening and through the large openings provided in oil seal well 16. Obviously, this is not possible if the front access opening 10 and the gap between sealing surface 22 and the housing end wall are tightly sealed as now made possible by newly developed sealing devices.

From the foregoing, it will be quite manifest that suitable provision should be made to maintain constant pressure conditions interiorly of the housing despite the constant to-and-fro movement of journal J. But before describing our novel pressure equalizing and breather device, brief comment will be made about the sealing devices for the front and rear openings to the housing.

Cover C for front access opening 10 includes, in addition to hinge 11, a sheet metal cover plate 30 having any suitable lost motion connection such as ball and socket 31 between its midportion and the lower end of hinge 11. The inner side of the cover is provided with a resilient gasket 32 capable of forming a positive seal with the rim edges of opening 10. Sealing pressure is applied to the cover by means of a heavy-duty spring toggle mechanism enclosed by hinge 11 and manually controllable through a lever 33 having a finger grip end 34. When the lever is pivoted upwardly against hinge 11, the toggle mechanism functions to apply very great closing pressure on cover 30 and its gasket 32. But when the control lever is pivoted outwardly about its lower end through an arc of approximately 90°, the toggle mechanism is released allowing the cover to be swung upwardly to its open position. Further details of this construction will be found in co-pending application for United States Letters Patent, Serial No. 417,692, filed by Dan A. Christensen et al. on or about March 22, 1954, and issued as Patent 2,743,968.

Oil seal S comprises a readily flexible bellow-like diaphragm 40 having its outer rim bonded to a flanged ring 41 and its inner rim bonded to a second flanged ring 42. Firmly secured within the latter ring is an outer dust sealing lip 43 and an inner oil sealing lip 44 spring-pressed against sealing surface 22 of the journal by a garter spring 45. The lip portions of both seals are made of suitable synthetic rubber resistant to oil. Clamped between the inner and outer sealing lips is a rigid guard ring 46 whose main function is to require ring 42 and the sealing lips to follow lateral movements of the journal without distorting the sealing lips. Further description of this seal S will be found in the application by Lloyd A. Johnson, et al., Serial No. 485,009, filed January 31, 1955, and later issued as Patent 2,823,051.

The means for anchoring and sealing the outer periphery of bellows 40 to the outer wall 18 of well 16 deserves brief comment. For this purpose, the radial flange of ring 41 carries a soft rubber sealing gasket 48. The means for holding this gasket immovably sealed against wall 18 includes a flanged ring 49 loosely nested within ring 41. Held captive between the radial flanges of rings 41 and 49 are a plurality of compression springs not visible but held centered about stud pins 50, 50 secured to the radial flanges of ring 49. Prior to assembly, the springs are held compressed by pairs of locking pins only one of which is indicated at 51. One pin of each pair is supported in side-by-side relation on the radial flanges of rings 41 and 49 so that the grooved heads of the pins can interlock with one another when the springs are compressed and the rings are rotated slightly in opposite directions. Once the sealing ring S is in its proper operating position, rings 41 and 49 are rotated slightly in reverse directions to disengage locking pins 51 and allow the springs to clamp ring 49 firmly against inner wall 17, and rings 41 and its gasket 48 firmly against outer wall 18.

By reference to Figure 2, it will be noted that the radial flange of anchor ring 49 is provided with a series of large area openings 53 in its two upper quadrants. The contour of the large area opening 15 in wall 17 has been indicated in phantom by dot and dash line 15 on Figure 2. This makes clear that openings 53 provide unobstructed communication between the interior of housing H and the upper portion of well 16. Also note that the axial flanges of rings 41 and 49 nest very loosely within one another thereby providing additional passages for the flow of air and oil between the well and the interior of the housing.

Heretofore, the upper end of the oil seal well 16 has been tightly closed by a cover bolted or otherwise tightly sealed across the entrance to the well. However, according to the present invention, the entire upper end of the oil seal well is utilized as an air flow and pressure equalizing passage between the interior of the housing and the outside atmosphere as well as the housing for an air filter. Despite the presence of the filter, it is most desirable to provide other means for excluding cinders, dirt, sand, and particularly brine and water.

A simple means of protecting the well entrance while assuring an adequate flow passage for air comprises a simple snap-on cover device generally designated 60. As here shown, it is formed from a rectangular sheet of metal 61 having a continuous down-turned rim 62 defining an area appreciably greater than the exterior walls of the well rim. As a result, flange 62 is spaced outwardly from the walls of the well at either side as well as at both ends.

The means for centering the cover over the well and for securely locking it in place comprises pairs of spring clips 63 and 64 secured to the interior side of the cover adjacent either end as by a rivet 65. While springs 63 and 64 may have various contours and shapes, those illustrated in the drawings have proven very satisfactory in practice. Thus, spring 63 is U-shape with converging ends which act as a pilot guiding the cover into the proper assembled position over the well entrance. Springs 64 are generally L-shaped and have hooked outer ends 66 shaped and positioned to engage the base of the flaring projections 67 at the opposite ends of the well entrance. In their unstressed position, the hooked ends 66 of the springs are closer together than the horizontal distance between the bases of projections 67.

All that is required to install the cover over the well is to insert spring clips 63 between the side walls and to hook one spring 64 in place against the base of one projection as indicated in dotted lines at the right-hand end of Figure 2. The operator then pushes horizontally against the right-hand end of the cover as he strikes the left-hand end a sharp blow with a mallet 68 causing the left-hand hook 66 to over-ride projection 67 and engage its base. The fully assembled position of the cover is shown in full lines in Figure 2.

As made clear by Figure 2, the horizontal legs of springs 64 are bent slightly away from the inner surface of the cover thereby preventing the cover from ever being pressed closed against the upper rim of the well and assuring a narrow air passage 68 between the inner sides of the cover and the rim of the well. Since this passageway is continuous throughout the circumference of the well, it is feasible to make the spacing very narrow and yet provide for a large flow of air.

Another important feature of the invention is the provision of suitable air filtering means 70 which extends from wall-to-wall at the upper portion of well 16. Care should be exercised in selecting a filter material which will not cause injury to the bearing surfaces should any portion of it become detached and fall into the journal housing. A loosely woven roll of fibrous material has proven highly satisfactory. Obviously, it is very difficult for particles of foreign matter to flow upwardly and through the tortuous passage 68 provided by cover 60. But if any matter does find its way through this passageway it is caught by the air filter and prevented from reaching the interior of the housing proper.

From the foregoing, it will be quite evident that we have provided a very simple, rugged, easily installed device for maintaining atmospheric pressure conditions in conventional journal housings provided with fluid-tight access covers and fluid-tight oil seals. Furthermore, the device makes it possible to supply large quantities of filtered air to a sealed journal housing without making any structural changes whatever in existing housings.

We claim:

1. A snap-on cover device for a railway truck journal housing of the type having a rear end wall with a rim defining a narrow deep well, generally rectangular in horizontal cross-section, opening downwardly through its top edge and adapted to house a resilient journal-sealing ring, each end of said rim having projections extending outwardly therefrom, said cover device comprising a sheet longer and wider than said rim with a down-turned continuous flange cooperable with said rim of said well to define an air passage opening into said well and having two pairs of flat-stock spring members secured to the under surface of said sheet adjacent each end, one spring of each pair projecting lengthwise outwardly and being generally L-shaped, with one leg generally horizontal but diverging from said sheet to prevent closure of said sheet against said rim, the other leg comprising a downwardly extending hook engageable with said projections on said rim to hold said cover firmly locked in assembled position, the divergence of the first named leg serving to hold the cover spaced sufficiently above the face of said well opening for the free flow of air therepast, the other spring of each pair being generally shaped like an inverted U with legs extending down and adapted to engage the longitudinal walls of said well for centering said cover with respect to the well with said flange spaced laterally from said rim to provide narrow air passages providing communication between the atmosphere and the interior of said housing.

2. A railway truck journal housing of the type having a rear end wall with a rim defining a narrow deep well, generally rectangular in horizontal cross-section, opening downwardly through its top edge and adapted to house a resilient journal-sealing ring, each end of said rim having outwardly extending projections, a cover member for the top of said well, said cover member having a flat top plate with a down-turned rim defining an area appreciably greater than that enclosed by the exterior walls of said well rim and cooperable with said well rim to define an air passage opening into said well, a generally L-shaped, lengthwise-extending spring member secured to the under surface of said plate a spaced distance from each end thereof and having a hooked outer end engageable with a said projection on said well rim to hold said cover firmly locked in assembled position, said spring members in their unstressed position having their hooked ends closer together than said projections, said spring members being bent slightly away from said cover to prevent said cover from being pressed closer against said well rim and providing sufficient space above said well rim for the free flow of air therepast, and a generally U-shaped spring with converging ends, inserted and secured to the under side of said plate below each said L-shaped spring member, and adapted to engage the longitudinal walls of said well for centering said cover with respect to the longitudinal walls of the well, the downturned rims of said cover member being thereby spaced laterally from the exterior rim of the well to provide narrow air passages providing communication between the atmosphere and the interior of said housing.

3. A snap-on cover device for the rear end wall of a railway truck journal housing of the type having a rim defining a narrow deep well, generally rectangular in horizontal cross-section, adapted to house a resilient journal-sealing ring, said wall having exterior detents at each end, said cover device comprising a flanged cap having two pairs of spring members secured to its under surface near each end, one spring of each pair projecting lengthwise outwardly but still within the flange and being generally L-shaped, with one leg secured to said cap at its free end and thence diverging from said cap and the other leg providing a downwardly extending hook engageable with a said detent to hold said cover device on, the divergence of the first named leg serving to space the cap above said well for the free flow of air thereinto, the other spring of each pair being generally shaped like an inverted U and adapted to engage the longitudinal walls of said well for centering said cover over the well.

References Cited in the file of this patent

UNITED STATES PATENTS

| | | |
|---|---|---|
| 1,836,652 | Ditmore | Dec. 15, 1931 |
| 2,152,580 | Barrows | Mar. 28, 1939 |
| 2,257,119 | Johanessen | Sept. 30, 1941 |
| 2,258,852 | Horn et al. | Oct. 14, 1941 |
| 2,315,455 | Sale | Mar. 30, 1943 |
| 2,417,853 | Armstrong | Mar. 25, 1947 |
| 2,657,080 | Johnson et al. | Oct. 27, 1953 |
| 2,668,067 | Fitzsimmons | Feb. 2, 1954 |
| 2,746,777 | Korn | May 22, 1956 |